United States Patent [19]
Leymann et al.

[11] Patent Number: 6,065,009
[45] Date of Patent: May 16, 2000

[54] EVENTS AS ACTIVITIES IN PROCESS MODELS OF WORKFLOW MANAGEMENT SYSTEMS

[75] Inventors: Frank Leymann, Aidlingen; Dieter Roller, Schönaich, both of Germany

[73] Assignee: International Business Machines Corporation, Armonk, N.Y.

[21] Appl. No.: 09/009,748

[22] Filed: Jan. 20, 1998

[51] Int. Cl.$^7$ .................................................. G06F 17/30
[52] U.S. Cl. .............................. 707/10; 707/9; 707/103; 714/15
[58] Field of Search ................................. 707/9, 10, 103; 714/15

[56] References Cited

U.S. PATENT DOCUMENTS

| | | | |
|---|---|---|---|
| 5,819,270 | 10/1998 | Malone et al. | 707/7 |
| 5,832,455 | 11/1998 | Hayashi et al. | 705/7 |
| 5,918,226 | 6/1999 | Tarumi et al. | 707/10 |

FOREIGN PATENT DOCUMENTS

| | | | |
|---|---|---|---|
| 0694838A | 3/1996 | European Pat. Off. | G06F 9/46 |
| 2263988A | 8/1993 | United Kingdom | G06F 15/20 |
| 94/18620 | 8/1994 | WIPO | G06F 7/06 |

OTHER PUBLICATIONS

D.J. Spoon: "Project Management Environment", IBM Technical Disclosure Bulletin, vol. 32, No. 9A, Feb. 1990, pp. 250–254.

R.T. Marshak: "IBM's FlowMark, Object–Oriented Workflow for Mission–Critical Applications", Workgroup Computing Report (USA), vol. 17, No. 5, 1994, pp. 3–13.

H.A. Inniss and J.H. Sheridan: "Workflow Management Based on an Object–Oriented Paradigm", IBM Technical Disclosure Bulletin, Vo. 37, No. 3, Mar. 1994, p. 185.

F. Leymann and D. Roller: "Business Process Management with FlowMark", Digest of papers, Cat. No. 94CH3414–0, Spring COMPCON 94, 1994, pp. 230–234.

F. Leymann: "A meta model to support the modelling and execution of processes", Proceedings of the 11$^{th}$ European Meeting on Cybernetics and System Research EMCR92, Vienna, Austria, Apr. 21 to 24, 1992, World Scientific 1992, pp. 287–294.

"IBM FlowMark for OS/2", document No. GH 19–8215–01, IBM Corporation, 1994.

F. Leymann and W. Altenhuber: "Managing business processes as an information resource", IBM Systems Journal, vol. 32(2), 1994.

D. Roller: "Verifikation von Workflows in IBM FlowMark", in J. Becker and G. Vossen (Hrsg.): "Geschaeftsprozessmodellierung und Workflows", International Thompson Publishing, 1995.

*Primary Examiner*—Paul R. Lintz
*Assistant Examiner*—Jean Bolte Fleurantin
*Attorney, Agent, or Firm*—Lacasse & Associates; Ray Strimaitis; Wesley L. Strickland

[57] ABSTRACT

WFMS execute a multitude of process models consisting of a network of potentially distributed activities. Within this structure is the implementation of events within WFMS like any other process activity. Thus events are implemented as event-activities, a special type of an activity within said WFMS. Such an event-activity can manage an event occurring internal or external to the WFMS.

15 Claims, 7 Drawing Sheets

Awaited Event Table

| ProcID | EventID | Event Name | Input Container |
|---|---|---|---|
|  |  |  |  |

Posted Event Table

| ProcID | EventID | Event Name | Input Container | Output Container |
|---|---|---|---|---|
|  |  |  |  |  |

FIG. 4

```
1  EVENT 'Wait for Customer Response'
2    EVENT_GENERATOR 'MailCheckProgram'
3    AUTOSTART
4    NOTIFY
```

FIG. 5

```
1  EVENT_ACTIVITY 'Wait for Response'
2    ('Event Identification', 'Response Information')
3    EVENT 'Wait for Customer Response'
4  END 'Wait for Response'
```

FIG. 6

```
1  EVENT_ACTIVITY 'Wait for Response'
2    ('Event Identification',
3     'Response Information')
4    EVENT 'Wait for Customer Response'
5    NOTIFICATION
6      AFTER 14 DAYS FORCE FINISH
7  END 'Wait for Response'
```

FIG. 7

```
1  STRUCTURE 'Event Identification'
2    'case number'  :  STRING ;
3    'customer name' : STRING ;
4  END 'Case Information'

5  STRUCTURE 'Response Information'
6    'response ID'  :    STRING ;
7    'type' :           STRING ;
8  END 'Letter Information'

9  STRUCTURE 'Case Information'
10   'case number'  :  STRING ;
11   'customer name' : STRING ;
12   'response ID' :   STRING ;
```

FIG. 9

```
1 PROGRAM_ACTIVITY 'Request Customer Info'
2   ('Default Data Structure', 'Case Information')
3     PROGRAM 'RequestCustomerInfo'
4 END 'Request Customer Info'

5 EVENT_ACTIVITY 'Wait for Response'
6   ('Event Identification',
7    'Response Information')
8     EVENT_TYPE 'Wait for Customer Response'
9 END 'Wait for Response'

10 PROGRAM_ACTIVITY 'Process Fax'
11   ('Case Information', 'DefaultDataStructure')
12     PROGRAM 'Process Fax'
13 END 'Process Fax'

14 CONTROL FROM 'Request Customer Info'
15      TO  'Wait for Response'
16 CONTROL FROM 'Wait for Response'
17      TO  'Process Fax'
18      WHEN 'type = "FAX"'
19 CONTROL FROM 'Wait for Response'
20      TO 'Process Letter'
21      WHEN 'type = "LETTER"'

22 DATA FROM 'Request Customer Info'
23    TO   'Wait for Response'
24 DATA FROM 'Wait for Response'
25    TO   'Process Fax'
26 DATA FROM 'Request Customer Info'
27    TO   'Process Fax'
28 DATA FROM 'Wait for Response'
29    TO 'Process Letter'
30 DATA FROM 'Request Customer Info'
31    TO 'Process Letter'
```

EVENTS AS ACTIVITIES IN PROCESS MODELS OF WORKFLOW MANAGEMENT SYSTEMS

BACKGROUND OF THE INVENTION

1. Field of Invention

The present invention relates to the field of process management in a workflow environment on computer systems and the field of computerized transaction processing. More particularly, the invention relates to the implementation of computerized event-activities within workflow management systems (WFMS).

2. Definitions

The following definitions of acronyms used throughout the specification may be useful in providing a better understanding of the subject matter of the present invention:

2PC: Two-Phase-Commit Protocol
ACP: Atomic Commit Protocol
DTS: Distributed Transaction Services
ISO: International Standard Organization
ODA: Object Definition Alliance
OMG: Object Management Group
OTS: Object Transaction Services
TM: Transaction Manager
TP: Transaction Processing
WfMC: Workflow Management Coalition
WFMS: Workflow Management System
XID: Transaction Identification A transactional work item, or transaction in general, are not to be construed to be limited to a local or distributed transaction. Accordingly, a transaction may be of any of these types. Moreover, when referring generally to a transaction, the textual context will define if a general concept is meant or if a transactional work item as a specific embodiment of a transaction is denoted.

3. Description and Disadvantages of Prior Art

A new area of technology, with increasing importance, is the domain of Workflow-Management-Systems (WFMS). WFMS supports the modeling and execution of business processes. Business processes control which piece of work of a network of pieces of work will be performed by whom and which resources are exploited for this work, i.e. a business process describes how an enterprise will achieve its business goals. The individual pieces of work might be distributed across a multitude of different computer systems connected by a network.

The process of designing, developing and manufacturing a new product, and the process of changing or adapting an existing product, presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release and manufacturing.

The correct and efficient execution of business processes within a company, e. g. development or production processes, is of enormous importance for a company and has significant influence on a company's overall success in the market place. Therefore, those processes have to be regarded similar to technology processes and have to be tested, optimized and monitored. The management of such processes is usually performed and supported by a computer-based process or workflow management system.

Copies of the documentation for the following prior art is available through IBM branches:

In D. J. Spoon: "Project Management Environment", IBM Technical Disclosure Bulletin, Vol. 32 , No. 9A, February 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, pages 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modeling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modeling of business processes as well as their execution are discussed. The product IBM FlowMark is available for different computer platforms.

In F. Leymann: "A Meta Model to Support the Modeling and Execution of Processes", Proceedings of the 11th European Meeting on Cybernetics and System Research EMCR92, Vienna, Austria, April 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, represents a typical modern, sophisticated and powerful workflow management system. It supports the modeling of business processes as a network of activities; refer for instance to "Modeling Workflow", document number SH 19-8241, IBM Corporation, 1996. This network of activities, the process model, is constructed as a directed, acyclic, weighted, colored graph. The nodes of the graph represent the activities or workitems which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e. g. by assigning tasks to a work list according to the respective person, wherein said work list is stored as digital data within said workflow or process management computer system.

In F. Leymann and W. Altenhuber: "Managing Business Processes as an Information Resource", IBM Systems Journal, Vol. 32(2), 1994, the mathematical theory underlying the IBM FlowMark product is described.

In D. Roller: "Verifikation von Workflows in IBM FlowMark", in J. Becker und G. Vossen (Hrsg.): "Geschaeftsprozessmodellierung und Workflows", International Thompson Publishing, 1995, the requirement and possibility of the verification of workflows is described. Furthermore the feature of graphical animation for verification of the process logic is presented as it is implemented within the IBM FlowMark product.

For implementing a computer-based process management system, firstly the business processes have to be analyzed and, as the result of this analysis, a process model has to be constructed as a network of activities corresponding to the business process. In the IBM FlowMark product, the process models are not transformed into at executable form. At run time, an instance of the process is created from the process model, called a process instance. This process instance is then interpreted dynamically by the IBM FlowMark product.

The concept of events as such, on the other hand, is known in the state of the art. Events, for example, play a role in database management systems. In database management systems, event/trigger mechanism have been developed for consistency checking in databases as described, for instance, in A. M. Kotz, Triggermechanismen in Datenbanksystemen, Springer Verlag, Berlin 1989. Also, events play a central role in the notion of active databases. In workflow systems, the semantics of an event is quite imprecise as applied by A. W. Scheer, Wirtschaftsinformatik, Springer Verlag, Berlin 1994, where the event can be a termination condition of a previous activity or an external signal, such as the arrival of a letter or, in general, an incident occurring independent from an activity informing an activity asynchroneously on some type of change. According to this prior art approach, an event is restricted to a quite limited spectrum of possible sources. The relationship between the activity and the event may be such that the activity requires that the event is signaled to it otherwise the activity will not continue beyond a certain point. It is also possible that an event signaled to an activity will be perceived by that activity and depending on that perception might modify the activity's ongoing processing. An event might result from anywhere within a computer system or even within networks of computer systems. Also, the source of an event might be a hardware device, some software construct, a human interacting with a running computer system and so forth.

Whatever the precise merits, features and advantages of the above cited references, none of them achieves or fulfills the purposes of the present invention. Accordingly, it is an object of the present invention to tightly integrate event mechanisms into workflow management systems. This and other objects are achieved by the detailed description that follows.

SUMMARY OF THE INVENTION

Workflow management systems (WFMS), encompassing one or more computers, execute a multitude of process models consisting of a network of potentially distributed activities. Each activity information defines within the WFMS which available programs or processes execute that activity. The current invention teaches realization of an event as an event activity encompassed by said process model, said event activity being implemented as a special type of activity of said WFMS and said event activity managing an event which may occur internal or external to the WFMS.

The present invention achieves a new level of integration between WFMS and event technology. By exploiting and reusing the activity features, very economic implementations for events are achieved. In addition, conceptual gaps between the concepts of activities, such as program or process and events, are completely avoided. Moreover, the approach enables handling of both, events occurring due to incidents within the WFMS, as well as events having their source external to a WFMS. By conceptually handling an event as any other activity, for instance as a process activity, this concept allows handling of any type of incident within a computer system as an event. The current approach thus supports the broadest possible spectrum of possible events. By reusing, to a certain extent, the implementations of activities, the overall system of a WFMS is not increased thereby supporting compact and very responsive overall WFMS.

Event activities are implemented by inheriting features and capabilities of the class of activities or of a sub-class thereof according to the principles of object-orientation. Such an approach allows for an elegant and very simple way of reusing capabilities already available within a system.

Event activities are implemented by associating with it an event generator being a program implementing said event. According to the invention an event activity may have associated with it an input container and/or an output-container, the event activity may be the source and/or target of one or more control-connectors and the event activity may be the source and/or target of one or more data-connectors. Moreover, it is taught by the present invention, that the event activity may be associated with a notification mechanism allowing to freely define one or more actions to be performed by the WFMS if the event activity is not completed within a freely defined time period.

The present invention's approach to events supports a complete transparency whether an event is of internal or external nature. Nevertheless, the present invention implements the event generator as a special purpose program handling any type of event. Separating the general aspects of an event, like signaling a dedicated consumer that the event happened, from the event generator avoids that these functions have to be realized over and over again. Instead these general aspects are implemented only once within the WFMS and are handled by the WFMS automatically. Of course, all features which are available to normal activities are made available to event activities too, thus easing the implementation of events significantly. For instance, input and output containers provide an event generator with run-time information or make results of an event available to consumers of an event.

The present invention introduces as one possible action, which may be performed by the notification mechanism, an automatic termination of the event if the event is not completed within a predefined time period. Such an approach provides simulation of a successful termination of an event activity if required.

The present invention provides that an event activity may be the source of one or more outgoing control connectors targeted at corresponding target activities. Such a process model will then make sure that the target activities will be informed automatically by the WFMS on the event, once the event is signaled to the waiting event activity, that an event activity has been terminated. An outgoing control connector optionally may be associated with a logical predicate as an outgoing transition condition modeling the fact that a target activity will be activated if said event activity terminated and said outgoing transition condition evaluates to true. The current invention furthermore teaches that one or more incoming control connectors, of the corresponding source activities, may target at an event activity. Such a process model will then allow the WFMS to automatically start the event activity once a source activity terminated its processing. An incoming control connector optionally may be associated with a logical predicate as incoming transition condition modeling the fact that the event activity will be started only by the WFMS, if in addition, said incoming transition condition evaluates to true.

The process graph provides definition via the control connectors which other activities are to be started after an event or which process activities automatically start an event activity. This technique establishes a standard approach to inform potential consumers on an event and to start an event activity and event generators. Thus the event activities, the event generators or the potential consumers are relieved from performing extra activities for that purpose. Moreover, event generators and event activities with interest in a certain event, either in creating or in waiting on an event, become significantly easier to implement. In addition, the above mentioned handling of the events are done automatically by the WFMS. The current invention does not restrict these source and target activities to a specific type of WFMS activities. Therefore, the source and/or target activities might represent standard process activities, program activities, or other types of activities, but according to the current invention it would be also possible that one or both of them represent event activities. In other words, the current invention also supports chains or even complex graphs of event activities.

The WFMS is activating an event activity automatically when instantiating a process model if said event activity is not a target of a control connector. Thus no extra implementation is required to start a certain event generator. The WFMS takes care of these aspects automatically.

The WFMS registers said event activity as awaiting consumer of said event once said event activity is activated by the WFMS and wherein further said WFMS registers said event as posted event once the occurrence of said event is signaled by said event generator. Due to this, the implementation of an event activity becomes much easier as the interest in a certain event is automatically detected by the WFMS by reading the process graph and the WFMS takes over responsibility to register an event activity's interest in that event. Moreover the implementation of event generators is also significantly simplified as an event signaled by an event generator is registered automatically by the WFMS as a posted event. This provides that a target activity is activated by said WFMS if, as a first condition the event activity terminated and if, as a second condition the outgoing transition condition evaluates to true independent at which point in time and in which sequence said first and said second condition are fulfilled. This behavior characteristic avoids that the signaled event is "consumed" if the transition condition is not fulfilled exactly at the point in time the event occurred.

An WFMS navigator is extended by performing navigation of an operation through the process graph of a process-model by an event management system extending and inter-operating with said WFMS navigator. The event management system encompasses the component of an event monitor administering awaited events in at least one awaited event table and further administering signaled events in at least one posted event table. An event generator is signaling the occurrence of said event to said event monitor. This teaching extends the navigator with additional features to administer on one side all events which have been signaled to and to handle on the other side all potential consumers of an event and to associate both sides. Neither event generators nor activities have to take care of these aspects.

The present invention provides for an event management system encompassing the component of an event manager maintaining information on the events allowing to verify correctness of an event if said event is being signaled. Such an access further increases the reliability of the overall system.

The WFMS sends, if it detects that an event activity is awaiting for an event, an awaited event notification to said event monitor and if then said event monitor detects a matching posted event indication in said posted event table said event monitor indicates said event together with event data to said WFMS. If otherwise no matching posted event notification is detected, said event monitor stores an awaited event indication in said awaited event table. Also, the event generator indicates the occurrence of an event by a posted event indication to said event monitor which verifies said posted event indication by consulting said event manager and then stores said posted event indication in the posted event table and, if then said event monitor detects a matching awaiting event indication in said awaiting event table, it indicates this together with event data to the WFMS. This approach improves responsiveness of the WFMS by at once checking whenever either a new event arrived, or a new consumer is waiting, for an event whether a matching event-consumer pair can be detected allowing the WFMS to inform that consumer on the signaled event. Further additional advantages of the invention are accomplished by informing the event generator, if an awaited event indication is stored in said awaited event table, on this awaited event indication. This technique informs an event generator automatically on consumers awaiting some kind of event. Such an approach avoids that an event generator periodically has to check for possible event consumers and thus avoids performance degradations.

BRIEF DESCRIPTION OF THE DRAWINGS

FIG. 4 depicts the structure of the "awaited event table" and the "posted event table."

FIG. 5 is a visualization of the FDL registration definitions required to model an event.

FIG. 6 is a visualization of the FDL definition of an event.

FIG. 7 is a visualization of the FDL definition for exploiting the notification mechanism for an event

FIG. 10 is a visualization of an event modeled as an event activity within the process model of the example of FIG. 8.

DESCRIPTION OF THE PREFERRED EMBODIMENT

Figure 1:
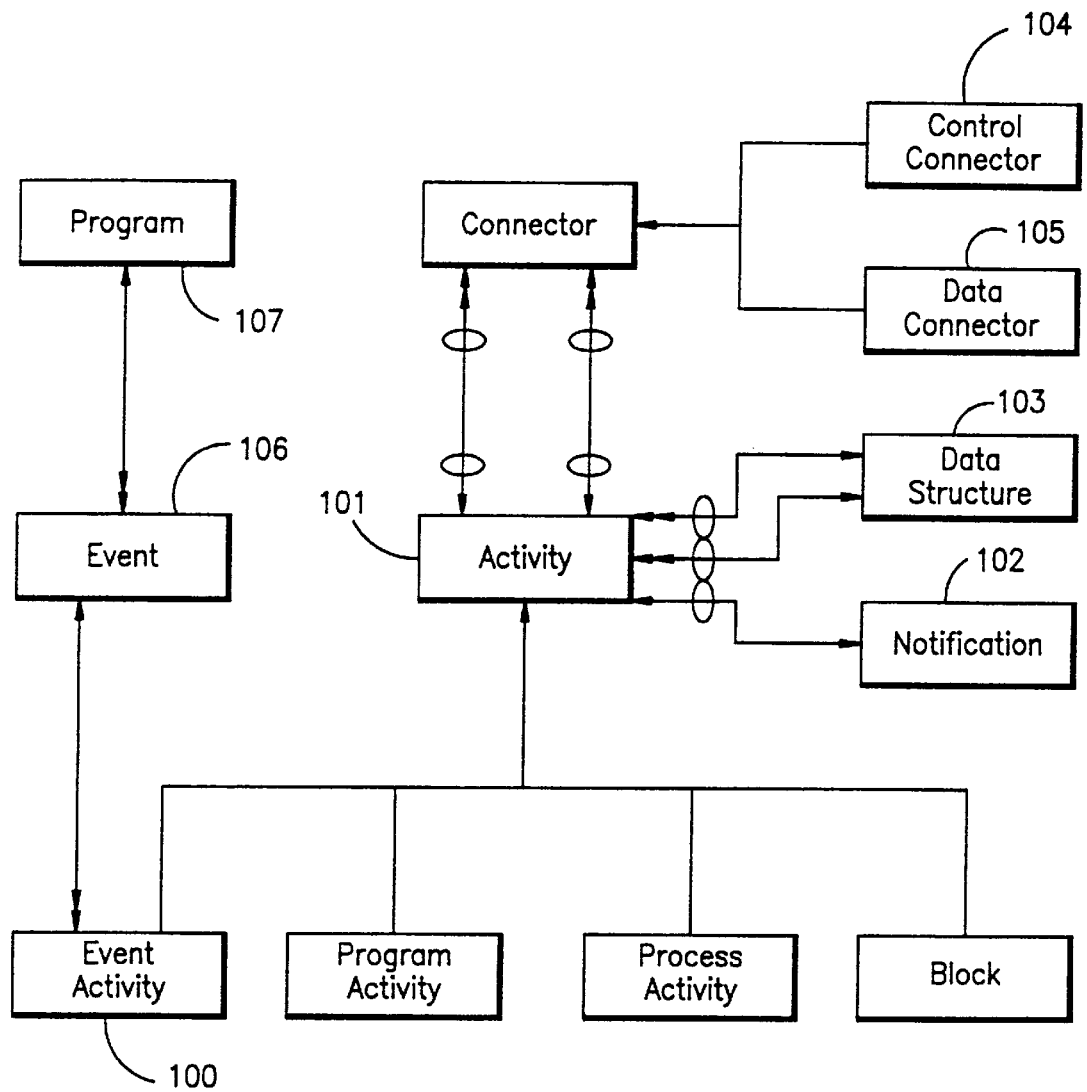
FIG. 1 is a diagram reflecting multiple aspects of the embedding of events as a new type of activity within a WFMS.

The current invention is illustrated based on IBM's Flow-Mark workflow management system. Other WFMS could be substituted without departing from the scope of the present invention. Furthermore, the current teaching applies also to other types of systems which offer WFMS functionalities not as a separate WFMS but within some other type of system.

INTRODUCTION

The following is a short outline on the basic concepts of a workflow management system based on IBM's FlowMark WFMS:

From an enterprise point of view, the management of business processes is becoming increasingly important: business processes or process for short, control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: the model, called a process model or workflow model, can then be instantiated and the individual sequence of work steps, depending on the context of the instantiation of the model, can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMS facilitates the management of business processes. It provides a means to describe models of business processes (build time) and it drives business processes based on an associated model (run time). The meta model of IBM's WFMS FlowMark, i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark the buildtime definitions process models are then converted into process templates for use by FlowMark at runtime. Important components of a FlowMark process model are:

Processes
Activities
Blocks
Control Flows
Connectors
Data Containers
Data Structures
Conditions
Programs
Staff Not all of these elements will be described below but are available as per the IBM FlowMark documents described heretofore.

On this background a process, modeled by a process model within FlowMark, is a sequence of activities that must be completed to accomplish a task. The process is the top-level element of a FlowMark workflow model. In a FlowMark process, it can be defined:

How work is to progress from one activity to the next

Which persons are to perform activities and what programs they are to use

Whether any other processes, called subprocesses, are nested in the process

Of course multiple instances of a FlowMark process can run in parallel.

Activities are the fundamental elements of the meta model. An activity represents a business action that is from a certain perspective a semantical entity of its own. With the model of the business process it might have a fine-structure that is then represented in turn via a model, or the details of it are not of interest at all from a business process modeling point of view. Refinement of activities via process models allows for both, modeling business processes bottom-up and top-down. Activities being a step within a process represents a piece of work that the assigned person can complete by starting a program or another process. In a process model, the following information is associated with each activity:

What conditions must be met before the activity can start
Whether the activity must be started manually by a user or can start automatically
What condition indicates that the activity is complete
Whether control can exit from the activity automatically or the activity must first be confirmed as complete by a user
How much time is allowed for completion of the activity
Who is responsible for completing the activity
Which program or process is used to complete the activity
What data is required as input to the activity and as output from it A FlowMark process model consists of the following types of activities:

Program activity: Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a sub-process assigned to perform it. The process is invoked when the activity is started. A process activity represents a way to reuse a set of activities that are common to different processes. Output from the process can be used in the exit condition for the process activity and for the transition conditions to other activities.

The flow of control, i.e. the control flow through a running process, determines the sequence in which activities are executed. The FlowMark workflow manager navigates a path through the process that is determined by the evaluation to true of start conditions, exit conditions, and transition conditions.

The results that are, in general, produced by the work represented by an activity is put into an output container, which is associated with each activity. Since an activity will, in general, require to access output containers of other activities, each activity is associated in addition with an input container too. At runtime, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the FlowMark workflow manager maps the data automatically.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model thus the potential flow of control within a business process model. Default connectors specify where control should flow when the transition condition of no other control connector leaving an activity evaluates to true. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In FlowMark processes, models' logical expressions can be defined that are evaluated by FlowMark at runtime to determine when an activity may start, end, and pass control to the next activity. Start conditions are conditions that determine when an activity with incoming control connectors can start. The start condition may specify that all incoming control connectors must evaluate to true, or it may specify that at least one of them must evaluate to true. Whatever the start condition, all incoming connectors must be evaluated before the activity can start. If an activity has no incoming control connectors, it becomes ready when the process or block containing it starts. In addition, a Boolean expression called transition condition is associated with each control connector. Parameters from output containers of activities having already produced their results are followed as parameters referenced in transition conditions. When at runtime an activity terminates successfully all control connectors leaving this activity are determined and the truth value of the associated transition conditions is computed based on the actual values of their parameters. Only the end points of control connectors, the transition conditions of which evaluated to TRUE, are considered as activities that might be executed based on the actual context of the business process. Thus, transition conditions model the context dependent actual flow of control within a business process (i.e. an instance of a model). Business processes encompass long running activities in general; such an activity needs to be allowed to become interrupted. Thus, termination of an activity does not necessarily indicate that the associated task has been finished successfully. In order to allow the measurement of successfulness of the work performed by an activity, a Boolean expression called exit condition is associated with each activity. Exactly the activities the exit condition of which evaluated to true in the actual context are treated as successfully terminated. For determination of the actual control flow precisely the successfully terminated activities are considered. Thus the logical expression of an exit condition, if specified, must evaluate to true for control to pass from an activity or block.

Besides describing the potential flow of control and data between activities, a business process model also encompasses the description of the flow of each activity itself between "resources" actually performing the pieces of work represented by each activity. A resource may be specified as a particular program, person, a role, or an organizational unit. At run time tasks are resolved into requests to particular persons to perform particular activities resulting in workitems for that person. Staff assignments are the means to distribute activities to the right people in the sequence prescribed by the control flow aspect of a business process model. Each activity in a process is assigned to one or more staff members defined in the FlowMark database. Whether an activity is started manually by the user or automatically by the FlowMark workflow manager, and whether it requires user interaction to complete or completes automatically, a staff member must be assigned to it. FlowMark staff definition entails more than identifying people at your enterprise to the FlowMark database. For each person defined, you can specify a level, an organization, and multiple roles. These attributes can be used at runtime to dynamically assign activities to people with suitable attributes.

In the FlowMark workflow manager, program means a computer-based application program that supports the work to be done in an activity. Program activities reference executable programs using the logical names associated with the programs in FlowMark program registrations. The program registration can contain run-time parameters for the executable program.

FlowMark consists, at the coarsest level, of a build time component and a run time component. The build time component supports the modeling of business processes according to the meta model described above and the run time component supports the corresponding semantics. Both components are implemented in a client/server structure. The client delivers the interaction with the user via an object-oriented graphical interface, invokes local tools, and provides animation. The server maintains the database for process instances, navigates through the process graph, and assigns the activities to the proper resources.

Process definition includes modeling of activities, control connectors between the activities, input/output container, and data connectors. A process is represented as a directed acyclic graph with the activities as nodes and the control/data connectors as the edges of the graph. The graph is manipulated via a built-in, event-driven, CUA compliant graphic editor. The data containers are specified as named data structures. These data structures themselves are specified via the Data Structure Definition facility. FlowMark distinguishes three main types of activities: program activities, process activities, and blocks. Program activities are implemented through programs. The programs are registered via the Program Definition facility. Blocks contain the same constructs as processes, such as activities, control connectors etc. They are, however, not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows to construct a process through permanent refinement of activities into program and process activities (top-down), but also to build a process out of a set of existing processes (bottom-up). In particular, process activities help to organize the modeling work if several process modelers are working together. It allows the team members to work independently on different activities. Program and process activities can be associated with a time limit. The time limit specifies how long the activity may take. If the time is exceeded, a designated person is notified. If this person does not react within another time limit, the process administrator is notified. It not only helps to recognize critical situations, but also to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place (similar to header files in programming languages.)

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows to make changes to the process model without affecting executing process instances. A process instance is started either via the graphical interface, or via the callable process application programming interface. When a process is started, the start activities are located, the proper people are determined, and the activities are posted onto the work list of the selected people. If a user selects the activity, the activity is executed and removed from the work list of any other user to whom the activity has been posted. After an activity has been executed, its exit condition is evaluated. If not met, the activity is rescheduled for execution, otherwise all outgoing control connectors and the associated transition conditions are evaluated. A control connector is selected if the condition evaluates to TRUE. The target activities of the selected control connectors are then evaluated. If their start conditions are true, they are posted to the work list of selected people. A process is considered terminated if all end activities have completed. To make sure that all end activities finish, a death path analysis is performed. It removes all edges in the process graph which can never be reached due to failing transition conditions. All information about the current state of a process is stored in the database maintained by the server. This allows for forward recovery in the case of crashes.

To achieve an integration of events within WFMS which is as seamless as possible, the basic approach of the current invention is to let events appear as a certain type of activity in terms of a WFMS. More precisely, this patent application teaches how events can be treated and implemented as a subclass of the class of activities inheriting (in the sense of object orientation) the common properties of activities.

FlowMark activities are either program activities or process activities. Program activities are implemented via a program which is invoked when the activity is executed. Process activities are implemented via a sub-process which is started when the activity is executed. The sequence of execution of the various activities of a process model are described via the control connectors. Activities which are only the target of control connectors are called end activities. Activities which are only the source of control connectors, are called start activities. Which control connector is being followed is defined via predicates. Each activity is associated with an input container and an output container. The input container contains the data required by the implementation of the activity to perform the correct processing; the output container is filled by the activity with information to control the process and data to be used by subsequent activities. Data connectors are used to describe what data from which output container should be used for the data in the input container of activities subsequent according to the process graph. Activities are associated with a notification mechanism which allows to specify that an action, such as sending a notification message to a designated user, is performed if the activity has not been worked on for a defined period of time.

The concept of events is the mechanism which allows the process modeler to specify that the process should wait at this point until the specified event happens. This event could be that a certain date occurs, or that a letter should be received from a customer. The occurrence of the event may be signaled from an activity within another process or from any other program, such as an agent in Lotus Notes. In general, an event is an incident occurring independent from an activity informing an activity asynchroneously on some type of change. This change might be internal or external to the WFMS. The relationship between the activity and the event may be such that the activity requires that the event is signaled to it otherwise the activity will not continue beyond a certain point. It is also possible that an event signaled to an activity will be perceived by that activity and depending on that perception might modify the activity's ongoing processing. An event might result from anywhere within a computer system or even within networks of computer systems. Also, the source of an event might be a hardware device, some software construct, a human interacting with a running computer system and so forth.

The present invention shows how events can be modeled within a WFMS as a special kind of activity, the event activity. It specializes, in the sense of object orient technology, the general activity and inherits all properties of the general activity. Therefore, an event (activity) may be associated with an input and output container and may be the source and the target of control connectors as well as the source and target of data connectors; i.e. all constructs and techniques available to general activities are available to event activities according to the current teaching too. Events may have a start condition and may be associated with a notification. An event activity is associated with an event similar to process activities which are associated with programs.

Thus, an "event" describes a conceptual and semantical entity, while the "event activity" is the model of that event modeled with the features of a WFMS. The programs associated with the event are called event generators and represent the means and constructs for creating or handling a particular event.

FIG. 1 reflects multiple aspects of the embedding of events as a new type of activity within a WFMS according to the teaching of the current invention. The new type of activity, the event activity 100, is realized as a sub-class of the class of activities 101. Via relationship and inheritance mechanisms, the full spectrum of features and capabilities available to activities is made available to event activities too. Thus, event activities may exploit the available notification features 102, the full spectrum of data structure features 103, or the various connector features like control connectors 104 and data connectors 105. Also shown by FIG. 1 is the relationship of the model of an event 106 with one or more event activities 100 and the relationship of a program 107, an event generator implementing or handling an event, with one or more event activities 106.

The control connectors originating from an event activity are treated as usual, i.e. their truth value of predicates potentially associated with those control connectors contribute to starting conditions of activities. Also, there may be more than one control connector emanating from a particular event activity. The usual navigation semantics will evaluate the transition conditions of the associated control connectors immediately; thus, events will not be physically consumed, in the sense that an event can be dedicated to a particular control connector leaving the event activity node, but are available for all originating branches. If exclusive validity of an event for a particular branch is required, it must be expressed via suitable transition conditions.

An event activity can also be a target of a control connector. This means that an instance of the corresponding event is created, but not signaled, if the transition condition of the control connector pointing to the event activity is fulfilled. Using control connectors pointing to event activities can be used to explicitly activate events within particular process instance contexts. If an event is activated, the activity waiting for that event has registered for that event and all other activities being, according to the FlowMark process model, the target of a control connector originating at the event activity are then potential consumers of that event.

Figure 2:
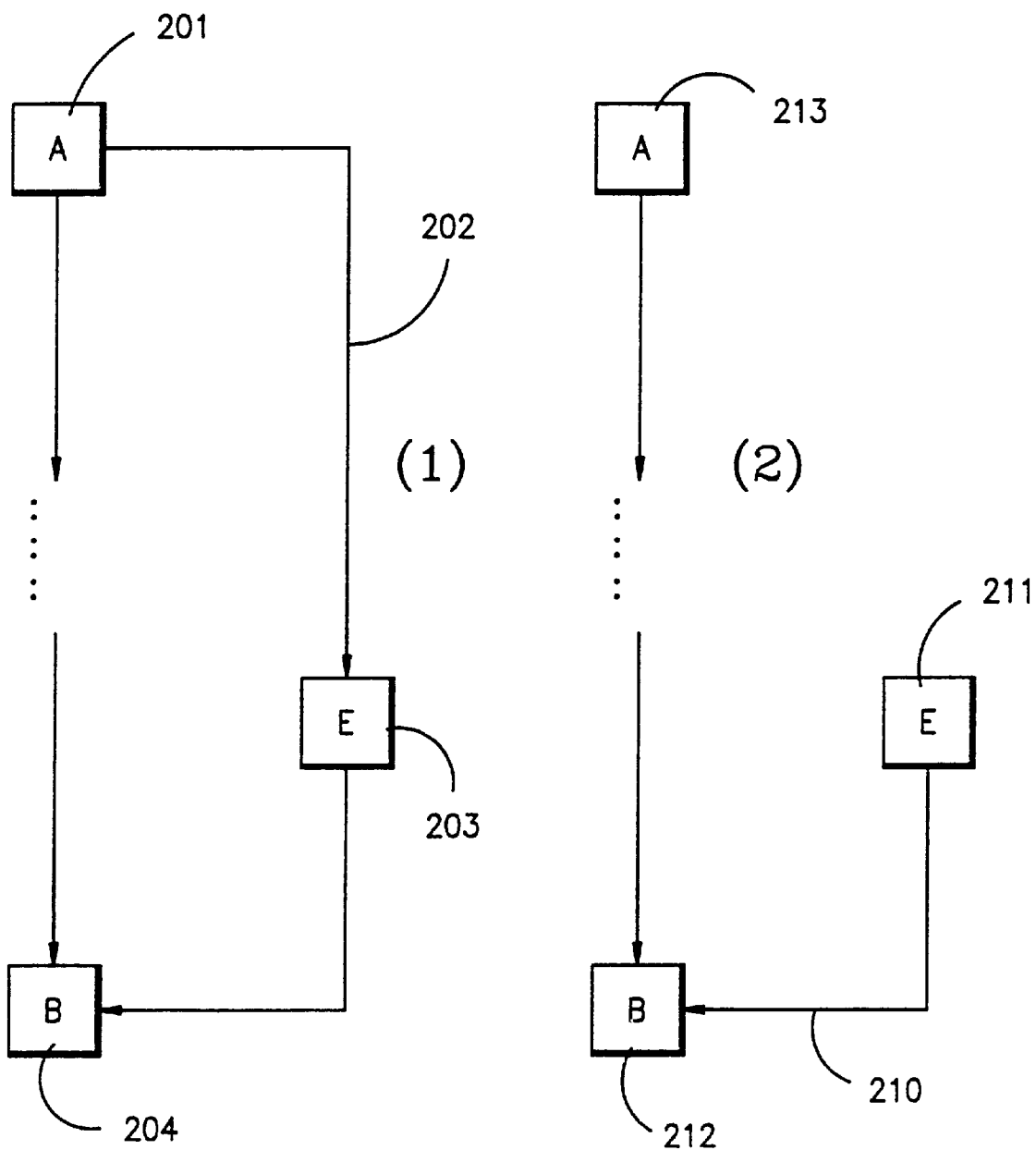
FIG. 2 is a visualization of the two fundamental embedding modes of events as event activities within a process model.

FIG. 2 illustrates how two different cases for embedding events as event activities within a process model can be differentiated, exactly as is the case with regular activities. On the left side (1), the activity A 201 must have terminated successfully and the transition condition 202 between A and the event activity E 203 must have been evaluated to 'true' before the event node E is sensitive for recognition. Thus, if an instance of E is signaled, this is not recognized before the transition condition between A and E is met. Once E is sensitive for recognition (i.e. activated) the activity B 204 has registered for the appropriate instance of E automatically through the modeled process graph. Event activities for this first type may be used, for instance, if the cause of an event is located at least partially within a process model itself.

On the right side (2), the transition condition 210 between the event activity E 211 and the activity B 212 will be evaluated as soon as the event E is recognized even if the activity A 213 has not been terminated. Consequently, E is activated when the process model is instantiated, i.e. B has registered for E right away.

When activating an event activity its associated input container is materialized. The usual rules for data connectors do apply. The output container of an event activity is created by the event generator associated with the subject event (see below).

COMPONENTS OF EVENT MANAGEMENT SERVICES

Figure 3:
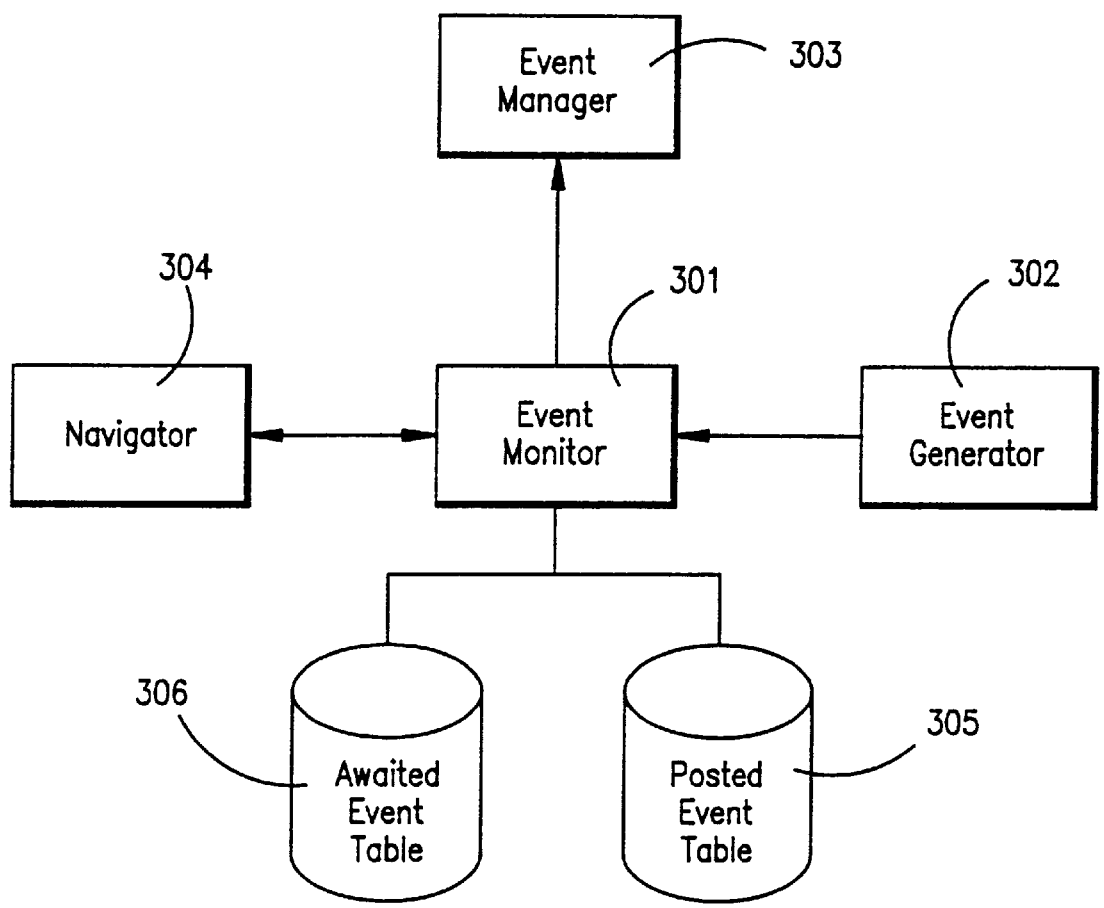
FIG. 3 reflects the major components of the Event Management System.

The navigator is the piece of the workflow management system that performs the navigation through the process graph. For handling events, this navigator is extended by an Event Management System encompassing event management services which are inter-operating with the navigator. These event management services are logically different components which may or may not coincide with physical means implementing those functions. FIG. 3 reflects the major components of the event management services. The event monitor 301 is responsible for keeping track of awaited and posted events. The event generators 302 are programs that signal the occurrence of an event to the event monitor. The event manager 303 keeps the information about events.

When the navigator 304 detects that an event is expected by particular activities of a process instance this is indicated to the event monitor. If the event monitor finds a matching entry in its posted event table 305 it indicates so immediately to the navigator and passes the associated data with its response. Otherwise, the event monitor reflects the awaited event by an appropriate entry in the awaited event table 306.

An event generator signals the occurrence of an event to the event monitor. The event monitor verifies the correctness of the event by consulting the event manager. If the event monitor detects a corresponding entry in the "awaited event table" this is indicated to the navigator. Otherwise, the event is inserted into the "posted event table".

The tables "awaited event table" and "posted event table" are first of all logical objects. Physically they actually may be implemented as different or as common tables.

TRACKING OF EVENTS

It can be perceived that events, and their event indications within the posted and awaited event table, are managed in tabular formats as depicted in the FIG. 4. ProcID refers to the identifier of the process instance in which the event is waited for. The EventID identifies a particular event in this process instance (as node in the process model.) The EventName refers to the category of the event and the InputContainer column contains the actual values of the fields in the associated input container of the event.

It has to be noted that the EventID is needed because events having an incoming control connectors are only "activated" if the transition conditions of the incoming control connectors are met and the start condition is true. An event which is not activated is not reflected in the "awaited event table". Events with no incoming control connectors are activated at process instantiation time.

The posted events table is used to store generated events which are currently not waited for, as no potential consumer has registered for it. Such an event is kept in this table until somebody registers for it (potentially, an event may be kept "forever") or, if it is removed, via garbage collection. The ProcID column in this table represents an optional value for tupels of this table and can be used for specifying particular process instances which might consume the event instance.

CANCELLING EVENTS

An awaited event can be cancelled in two ways: (1) as the result of a notification action, such as FORCE TERMINATE, or (2) through an explicit request from the user via functions supplied by the event monitor. When an awaited event is cancelled, it is removed from the waited event table and the event monitor signals the completion of the event to the navigator. Any outgoing control connector is treated as if the event had happened normally.

EVENT IDENTIFICATION

The association of an incoming event, such as receiving a letter, with the waited for event is performed by comparing the identification fields provided by the event generator with the fields defined in the input container plus the fields defined in the input container by default, which is the process instance identification and the event identification. No problem arises if the event generator itself provides the process instance identification and the event identification. If the process instance identifier is not supplied, the fields in the input container are compared with the appropriate fields delivered by the event generator (signature matching).

EVENT GENERATOR

The event generator signals that an event has happened by calling the event monitor via the event monitor interface.

The event generator can determine when the event should be signaled. This can be done by periodically querying the event monitor to determine if a new entry for the event generator has been entered in the awaited event table. An event generator may also register itself with the event monitor and request that each new registration of an awaited event is signaled to the event generator.

The supplied date/time event generator, for example, has a data structure with a date field and a time field. These fields can either be filled by a data connector leading to that event or values set as defaults by the process modeler. The time/date event generator has registered with the event monitor that it should be called when a new event is registered.

EVENT MONITOR PROGRAMMING INTERFACE

The event monitor provides an application programming interface to allow applications to request event monitor functions. The set of functions include requests, such as querying the posted event table, removing entries from the posted event table, querying the awaited event table, removing entries from the awaited event table, and inserting entries into the posted event table.

EVENT REGISTRATION

An event activity is always associated with an event. The event has a number of properties: the name of the program implementing the event generator, the name of the event, and an indicator whether the event generator should be started as part of starting the FlowMark server. An important property is the operation mode of the event generator, which defines whether the event generator should be called every time a new event is added to the awaited events table or not. If specified, this allows the event generator to keep internal tables for efficient processing and does not require periodically reading the awaited event table.

EVENT NOTIFICATION

Events also inherit (in the sense of object oriented technology) the notion of notification from the activity. Notification allows to define actions which are taken whenever the defined time for completion is exceeded. Extensions to the notification mechanism allow to specify other actions than just sending a notification message to a designated person. These extensions include actions like terminating the activity.

PROCESS MODEL ADDITIONS

The support of events requires minor additions to the FlowMark Definition Language (FDL).

Events are registered (in the sense of the FDL) via the EVENT section. It is similar to the PROGRAM section which supports the registration of programs. FIG. 5 shows the FDL registration of the event "Wait for Customer Response". The associated generator program is "MailCheckProgram". The program is started as a result of starting the FlowMark server, specified due to AUTOSTART, and is notified whenever an event is entered into the awaited event table, specified due to NOTIFY.

Event activities of a process model are defined via the EVENT_ACTIVITY section. This mechanism is almost identical to the PROGRAM_ACTIVITY keyword. The event type is specified via the EVENT_TYPE keyword followed by a string containing the event type. A particular event type may be specified only once within a process model. FIG. 6 shows how an event is defined. The data structure "Event Identification" defines the structure of the input container associated with the event. It contains all relevant information to identify the event. This information is used by the event monitor to compare it with the information supplied by the event generator. The data structure "Response Information" defines the structure of the output container associated with the event. The data is supplied by the event generator.

Notification of events is enhanced to provide the capability to force terminate the event, that means that the event is considered complete even if no event has been signaled during the specified time. FIG. 7 shows how it could be specified that it should only be waited 14 days for the customer letter to arrive.

ADVANTAGES

The proposed method of treating events as activities has, besides the effect of offering a seamless extension and transition of workflow activities, a number of advantages over other possible approaches that treat events differently.
1 Events follow the same metaphor as activities.
   1.1 Control Connectors activate an event. The predicates on the incoming control connectors, as well as, the outgoing control connectors allow to specify which event should be waited for and which activity should be executed as the result of the happening of an event. Events without an incoming control connector are immediately activated as are start activities.
   1.2 Data Connectors allow to fill the input container with the event relevant data. No new mechanism is required to identify the instance of the event for which it should be waited for.
   1.3 Input Containers identify to activities what the context is in which they are called. The same is true for event activities as the contents of the input container identifies the particular characteristics of the event which is waited for.
   1.4 Output Containers contains the process relevant information generated by an activity. For event activities, the event signaler provides this information, for example, the identification of the letter which has been received, which is process relevant information.
   1.5 Notification allows to specify what should happen if an activity has not been completed within a defined time limit. The same behavior is true for event activities, where this mechanism is used in the same way.
   1.6 Events can be handled within Spheres of Joint Compensation the same way as activities.
2 Events can be graphically managed the same way as are activities.
3 Events can be described in the FlowMark Definition Language with similar constructs as program activities.
4 Treating events as activities allows to re-use the code used for processing process models, such as navigating the graph. Re-use of this code provides a number of advantages, such as
   4.1 Less errors
   4.2 Easier testing
5 Events can be monitored the same way as other activities via the process instance monitor.

In summary, these advantages help to compress the overall system, contribute to minimize the implementation effort and thus, increase the responsiveness of the WFMS.

EXAMPLE 1

Figure 8:
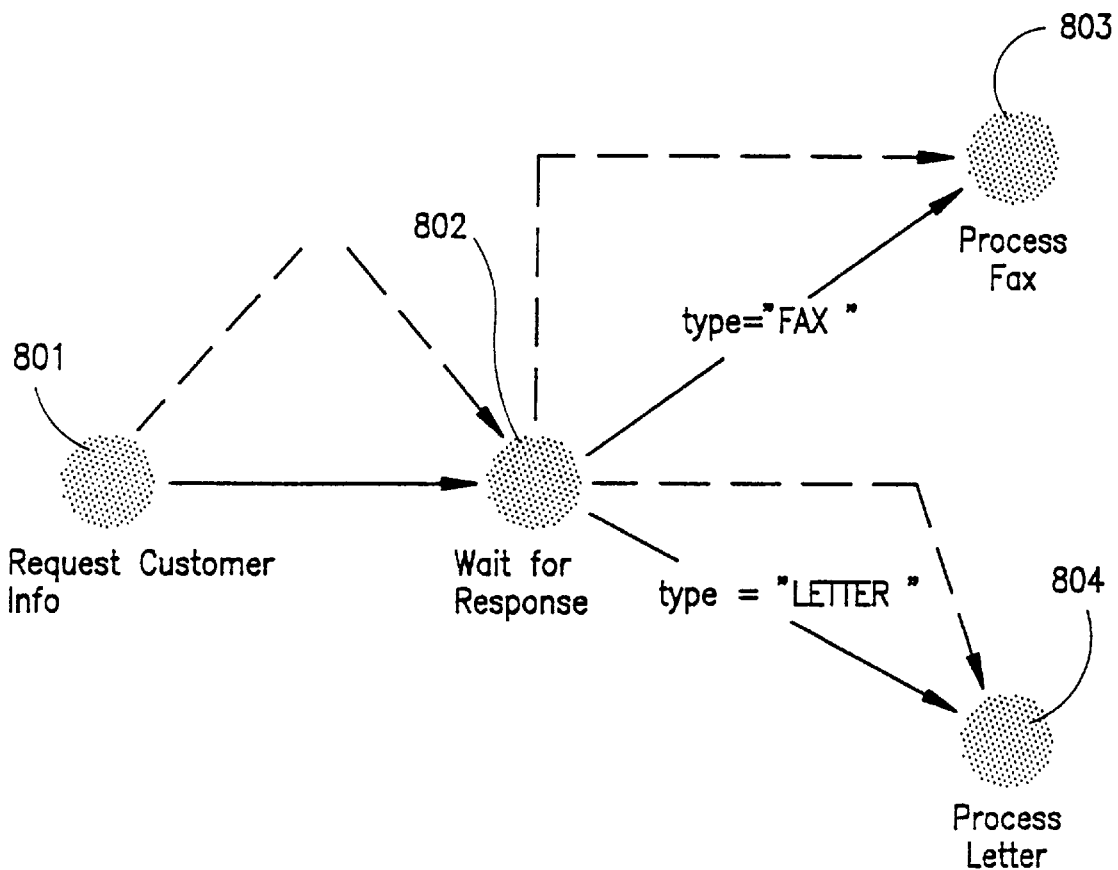
FIG. 8 is a simple sample process model reflecting the usage of event activities FIG. 9 reflects the most important data structures of the example of FIG. 8.

A simple process model in FIG. 8 illustrates the usage of events. In a claims processing application of this example, additional information is required from a customer 801. The process waits until information is received 802. If the customer responded via fax, the fax is processed with a certain piece of software 803, otherwise another piece of software is used 804.

FIG. 9 shows the definitions of the most important data structures being of importance within the example of FIG. 8. Finally, FIG. 10 is a visualization of the event modeled as an event activity "Wait for Response" in lines 5 to 9 within the process model of the example of FIG. 8. FIG. 10 further demonstrates in lines 14 to 21 usage of control connectors and in line 21 to 31 usage of data connectors for the event activity.

CONCLUSION

A system and method has been shown in the above embodiments for the effective implementation of events as activities in process models of workflow management systems. While various preferred embodiments have been shown and described, it will be understood that there is no intent to limit the invention by such disclosure, but rather, it is intended to cover all modifications and alternate constructions falling within the spirit and scope of the invention as defined in the appended claims.

What is claimed is:

1. A computer-based system comprising one or more computers storing an implementation of a process-model for a workflow-process-environment, said computer-based system comprising:

said process-model managed and executed by said computer-based system;

at least one event-activity encompassed by said process-model, said event-activity being implemented as an activity of said workflow-process-environment, said event-activity associated with an event, has associated with it an input-container and/or an output-container, is the source and/or target of one or more control-connectors, is the source and/or target of one or more data-connectors, and wherein said event-activity is associated with a notification-mechanism defining at least one action to be performed by the workflow-process-environment if said event-activity is not completed within a freely defined time period;

said event-activity managing an event occurring internal or external to the workflow-process-environment, and wherein said event is implemented by an event-generator.

2. A computer-based system according to claim 1 wherein said event-activity being implemented inherits features and capabilities of a class of activities or of a sub-class thereof according to the principles of object-orientation.

3. A computer-based system according to claim 1 wherein said event-generator is implemented as a program.

4. A computer-based system according to claim 1 wherein an action automatically terminates said event-activity.

5. A computer-based system according to claim 1 wherein said process-model further comprises at least one outgoing-control-connector, said event-activity being the source and a target-activity being the target of said outgoing-control-connector;

wherein said outgoing-control-connector optionally may be associated with a logical predicate as outgoing-transition-condition, and wherein said workflow-process-environment activates said target-activity if said event is signaled to said waiting event-activity and finally said event-activity terminated and if said outgoing-transition-condition evaluates to TRUE.

6. A computer-based system according to claim 5 wherein said workflow-process-environment registers said event-activity as awaiting consumer of said event once said event-activity is activated by said workflow-process-environment, and wherein further said workflow-process-environment registers said event as posted-event once the occurrence of said event is signaled by said event-generator.

7. A computer-based system according to claim 6 further comprising a workflow-navigator performing navigation of operation through the process-graph of said process-model and said computer-based system being further characterized by:

an event-management-system extending and interoperating with said workflow-navigator, and said event-management-system further comprises the component of an event-monitor administering awaited events in at least one awaited-event-table and further administering signaled events in at least one posted-event-table, and wherein said event-generator is signaling the occurrence of said event to said event-monitor.

8. A computer-based system according to claim 7 wherein said event-management-system further comprises an event-manager maintaining information on said event allowing to verify correctness of said event if said event is being signaled.

9. A computer-based system according to claim 8 wherein said workflow-navigator sends, if it detects that said event-activity is awaiting for said event, an awaited-event-notification to said event-monitor and if then said event-monitor detects a matching posted-event-indication in said posted-event-table said event-monitor indicates said event together with event-data to said workflow-navigator or if otherwise no matching posted-event-notification is detected said event-monitor stores an awaited-event-indication in said awaited-event-table, and wherein said event-generator indicates the occurrence of said event by a posted-event-indication to said event-monitor which verifies said posted-event-indication by consulting said event-manager and then stores said posted-event-indication in said posted-event-table and if then said event-monitor detects a matching awaiting-event-indication in said awaiting-event-table it indicates this together with event-data to said workflow-navigator.

10. A computer-based system according to claim 9 wherein said event-generator is informed, if said awaited-event-indication is stored in said awaited-event-table, on this awaited-event-indication.

11. A computer-based system according to claim 5 wherein said target-activity is activated by said workflow-process-environment if, as a first condition, said event-activity terminated and if, as a second condition, said outgoing-transition-condition evaluates to true independent at which point in time and in which sequence said first and said second condition are fulfilled.

12. A computer-based system according to claim 1 wherein said workflow-process-environment is activating said event-activity automatically when instantiating said process-model if said event-activity is not a target of a control-connector.

13. A computer-based system according to claim 1
wherein said process-model further comprises at least one incoming-control-connector, said event-activity being the target and a source-activity being the source of said incoming-control-connector;

wherein said incoming-control-connector optionally may be associated with a logical predicate as incoming-transition-condition, and wherein said workflow-process-environment activates said event-activity if said source-activity terminated and said incoming-transition-condition evaluates to TRUE.

14. An article of manufacture comprising a computer user medium having computer readable code embodied therein storing an implementation of a process-model for a workflow-process-environment, said computer readable code comprising:

computer readable code for causing a computer to effect process-model management and execution thereof;

computer readable code for causing at least one event-activity encompassed by said process-model, said event-activity being implemented as an activity of said workflow-process-environment, said event-activity associated with an event, has associated with it an input-container and/or an output-container, is the source and/or target of one or more control-connectors, is the source and/or target of one or more data-connectors, and wherein said event-activity is associated with a notification-mechanism defining at least one action to be performed by the workflow-process-environment if said event-activity is not completed within a freely defined time period, and computer readable code for causing said event-activity to manage an event occurring internal or external to the workflow-process-environment.

15. A computer program product for implementation of a process-model for a workflow-process-environment, said computer program product comprising:

computer readable code for causing a computer to effect process-model management and execution thereof;

computer readable code for causing at least one event-activity encompassed by said process-model, said event-activity being implemented as an activity of said workflow-process-environment, said event-activity associated with an event, has associated with it an input-container and/or an output-container, is the source and/or target of one or more control-connectors, is the source and/or target of one or more data-connectors, and wherein said event-activity is associated with a notification-mechanism defining at least one action to be performed by the workflow-process-environment if said event-activity is not completed within a freely defined time period, and computer readable code for causing said event-activity to manage an event occurring internal or external to the workflow-process-environment.

* * * * *

UNITED STATES PATENT AND TRADEMARK OFFICE
CERTIFICATE OF CORRECTION

PATENT NO.     : 6,065,009
DATED          : May 16, 2000
INVENTOR(S)    : Leymann et al.

It is certified that error appears in the above-identified patent and that said Letters Patent is hereby corrected as shown below:

ON THE TITLE PAGE

Insert
--Foreign Application Priority Data--
--1/20/97     [EP]    Europe           97100779.4--

Signed and Sealed this

Nineteenth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,065,009
DATED : May 16, 2000
INVENTOR(S) : Leymann et al.

It is certified that error appears in the above-identified patent and that said Letters Patent is hereby corrected as shown below:

Column 2,
Line 50, change "workitems" to -- work items --.

Column 3,
Line 3, after "Furthermore" insert -- , --.
Line 11, change "run time" to -- runtime --.
Line 19, change "mechanism" to -- mechanisms --.

Column 4,
Line 45, change "run-time" to -- runtime --.

Column 6,
Line 8, change "awaiting" to -- waiting --.
Line 53, after "event" insert -- . --.
Line 55, after "activities" insert -- . --.

Column 7,
Line 35, change "(run time)" to -- (runtime) --.

Column 9,
Line 9, change "model thus" to -- thus model --.
Line 67, change "run time" to -- runtime --.

Column 10,
Line 20, change "run-time" to -- runtime --.

Column 12,
Line 31, change "orient" to -- oriented --.

UNITED STATES PATENT AND TRADEMARK OFFICE
CERTIFICATE OF CORRECTION

PATENT NO. : 6,065,009
DATED : May 16, 2000
INVENTOR(S) : Leymann et al.

It is certified that error appears in the above-identified patent and that said Letters Patent is hereby corrected as shown below:

Column 14,
Line 26, after "having" delete -- an --.

Signed and Sealed this

Eleventh Day of February, 2003

JAMES E. ROGAN
*Director of the United States Patent and Trademark Office*